(12) United States Patent
Gupta et al.

(10) Patent No.: US 7,571,192 B2
(45) Date of Patent: Aug. 4, 2009

(54) METHODS AND APPARATUS FOR MAINTAINING CONSISTENCY DURING ANALYSIS OF LARGE DATA SETS

(75) Inventors: Anurag Gupta, Atherton, CA (US); Kumar Ramaiyer, Cupertino, CA (US); Matthew Shore, San Mateo, CA (US); John Xiao, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 735 days.

(21) Appl. No.: 11/154,259

(22) Filed: Jun. 15, 2005

(65) Prior Publication Data

US 2006/0288046 A1    Dec. 21, 2006

(51) Int. Cl.
*G06F 12/00* (2006.01)
*G06F 17/30* (2006.01)

(52) U.S. Cl. ............... 707/200; 707/102; 707/104.1; 707/203

(58) Field of Classification Search ............. 707/102, 707/104.1, 200, 203
See application file for complete search history.

(56) References Cited

U.S. PATENT DOCUMENTS

| | | | |
|---|---|---|---|
| 5,497,486 A | 3/1996 | Stolfo et al. | |
| 5,907,711 A * | 5/1999 | Benitez | 717/145 |
| 6,035,306 A | 3/2000 | Lowenthal et al. | |
| 6,205,447 B1 | 3/2001 | Malloy | |
| 6,263,334 B1 | 7/2001 | Fayyad et al. | |
| 6,374,252 B1 | 4/2002 | Althoff et al. | |
| 6,393,434 B1 * | 5/2002 | Huang et al. | 707/200 |
| 6,466,950 B1 * | 10/2002 | Ono | 707/201 |
| 6,493,699 B2 | 12/2002 | Colby et al. | |
| 6,542,883 B1 * | 4/2003 | Salo | 707/104.1 |
| 6,609,123 B1 * | 8/2003 | Cazemier et al. | 707/4 |
| 2001/0013030 A1 * | 8/2001 | Colby et al. | 707/1 |
| 2003/0088540 A1 * | 5/2003 | Edmunds et al. | 707/1 |
| 2003/0149571 A1 | 8/2003 | Francesco et al. | |
| 2003/0204534 A1 * | 10/2003 | Hopeman et al. | 707/200 |
| 2004/0024790 A1 | 2/2004 | Everett | |
| 2005/0262108 A1 | 11/2005 | Gupta | |

OTHER PUBLICATIONS

International Search Report, dated Oct. 12, 2006, from related International Application No. PCT/US05/15244.
Written Opinion of the International Searching Authority, dated Oct. 12, 2006, from related International Application No. PCT/US05/15244.
Office Action dated Aug. 23, 2007, received in related U.S. Appl. No. 10/841,923.

\* cited by examiner

*Primary Examiner*—Tim T. Vo
*Assistant Examiner*—Garrett Smith
(74) *Attorney, Agent, or Firm*—Townsend and Townsend and Crew LLP

(57) ABSTRACT

Methods and apparatus for updating a database using a multi-dimensional data model in which data corresponding to the database are organized in multi-dimensional data blocks. Each data block has summary information associated therewith corresponding to a current state of evolution of the associated data block. Dependency information is maintained in the data model which identifies data dependencies within and among the data blocks. A list of change entries identifies changes made to the data blocks and times at which the changes were made. A request to apply a change entry to a data block is received. The change entry is applied to the data block, including generating a dependency list of data blocks whose data depends directly or indirectly from the updated data block. The data blocks in the dependency list are processed in accordance with a dependency update algorithm to update the data blocks in the dependency list.

29 Claims, 2 Drawing Sheets

METHODS AND APPARATUS FOR MAINTAINING CONSISTENCY DURING ANALYSIS OF LARGE DATA SETS

CROSS REFERENCE TO RELATED APPLICATIONS

The present application is related to U.S. patent application Ser. No. 10/841,923, entitled, "METHODS AND APPARATUS FOR FACILITATING ANALYSIS OF LARGE DATA SETS" filed May 7, 2004, which is incorporated herein by reference in its entirety.

BACKGROUND

The present invention relates to techniques for analyzing large data sets and, more specifically, to methods and apparatus for efficiently running "what if" scenarios with large, multi-dimensional data sets.

The term "data management software" encompasses a vast array of solutions for manipulation of business data which can be loosely organized into three categories, On-Line Transaction Processing (OLTP), data warehousing, and On-Line Analytical Processing (OLAP). Each of these categories has certain advantages and drawbacks, which were discussed in the above-referenced application.

In short, OLTP relates to a class of solutions that facilitate and manage transaction-oriented applications, typically for data entry and retrieval transactions in a number of industries including, for example, banking, airlines, mail order, supermarkets, and manufacturing. It is an important goal of an OLTP system that the data stored in the system is readily accessible to ensure a high degree of responsiveness. It is also important to provide locking mechanisms to ensure, for example, that when an individual reserves a resource, e.g., an airline seat, that resource is no longer available to others in the system. Thus, in OLTP systems, storing of data in more than one place is disfavored, emphasizing instead a heavy reliance on joint processing of the different tables to combine data. OLTP systems are very effective for real-time transaction processing, but not particularly suited to reporting functions employing aggregate queries, e.g., show all of the people who are flying on a particular flight more than twice a month.

Data warehousing employs different data schemas, which are better suited to support relatively sophisticated reporting functions. However, there may be a tremendous amount of duplication of data. In the OLTP context, this duplication is not acceptable, since a change to a single piece of data would need to be duplicated in many places in the data warehouse tables instead of just a single location. On the other hand, data warehousing is advantageous from a reporting perspective in that it allows the creation and maintenance of summary tables which aggregate information which correspond to queries in which a particular business might be particularly interested, for example, passenger loads for specific routes by fiscal quarter. While data warehousing systems are highly optimized to generate static reports, they do not efficiently support analysis of the data in which the questions are not known in advance. For example, a sales manager may look at a static report and see that nation-wide sales of a specific product during a particular month were lower than expected. However, because of the static nature of the report, the reason for the shortfall may not be apparent. In such a situation, the sales manager would like to be able to drill down into the data to determine, for example, whether there are any identifiable disparities (e.g., regional, temporal, etc.), which might serve as an explanation. These types of capabilities fall within the domain of OLAP.

OLAP systems organize data to allow the kind of ad hoc analysis which would allow the sales manager to zero in on the data that might explain the disparity identified in the static report. This is to be contrasted with OLTP solutions which are highly optimized for retrieving detailed data and typically very poor at providing summaries. The OLAP approach is also to be contrasted with data warehousing solutions that would be required to maintain an impracticable number of summary tables to duplicate such functionality. A significant issue with OLAP solutions relates to the fact that they are typically only optimized for batch processing (as opposed to transaction processing which is characterized by near real-time updating). Due to the large amount of highly interdependent summary information in the data underlying an OLAP system, the updating of any piece of detailed data tends to be computationally expensive in that many different summaries on many different levels of the hierarchy will typically need to be invalidated and recalculated. Thus, instead of supporting the interactive updating of data, most OLAP systems typically employ batch recalculations. There are OLAP solutions that attempt to strike various compromises to at least give the appearance of interactive updating. For example, some solutions limit the data set or indices upon it, such that it fits in main memory and then interactively recalculate all data values upon retrieval. Other solutions employ scripting techniques to isolate and update subsets of data between batches. Unfortunately, these approaches only partially mitigate the inefficiencies associated with updating multi-dimensional data sets. As a result, while OLAP systems are effective at the ad-hoc querying of data to assist in identifying and locating issues, they are relatively ineffective at the ad-hoc update or "what-if" scenario analysis needed to understand the implications of making changes to address those identified issues.

The above referenced patent application describes a number of techniques by which large, complex data sets may be more efficiently invalidated and recalculated to reflect changes. Change logging is employed in the maintenance of summary information for large data sets, in combination with dependency checking among data blocks for different levels of hierarchical data in such data sets. As a result, the time required to update or recalculate the underlying data is closer to being a function of the number of changes made rather than, as with most OLAP solutions, a function of the size of the data set or the number of dimensions. Furthermore, the described techniques also allow the running of multiple "what if" scenarios using the same underlying data set substantially simultaneously. Different users can run these multiple peer scenarios in parallel. Alternatively, a single user may have multiple levels of scenarios, that is, child scenarios based on the results of a parent scenario, none of which is currently practicable in the conventional OLAP domain. As the complexity of the users' "what if" scenarios increases, there is an increased need for a well-structured system that enables performing changes and updates and that supports rich analytics, compared to what is possible in conventional OLAP systems.

SUMMARY

In general, in one aspect, the invention provides methods and apparatus, including computer program products, implementing and using techniques for providing an on-change applicator for applying changes to multi-dimensional data blocks in a database using a multi-dimensional data model. Each data block includes several data elements. The on-change applicator includes computer program code for: receiving a request to update one or more data elements in a data block; obtaining a change information entry from a list of change information entries; and updating the data elements in the data block in accordance with one or more rules selected based on the data elements that are affected by the update, the updating using only the obtained change information entry and data elements already existing in the data block, whereby the on-change applicator ensures that all data utilized in the updating is as of a consistent point in time.

Various implementations can include one or more of the following features. The rules can include one or more mathematical formulas defining expressions for updating each type of data element in the data block. The change information entries can include at least the following elements: a change information entry number describing when the change entry was created, locations of one or more data elements that are affected by the change information entry, old values for the data elements, and new values for the data elements. The change information entry can include a vector of new values for the data elements, and the computer program code for updating the data elements includes computer program code for updating several data elements of the data block in a single operation using the vector. The on-change applicator can include computer program code for determining when to apply the change information entry to the data block with reference to updates performed by other on-change applicators, where the determination is made with respect to a dependency structure in the data model that identifies data dependencies between data elements within and among the data blocks. The on-change applicator can include computer program code for determining when to calculate data values within the data block between application of two separate on-change applicators, where the determination is made with respect to a dependency structure in the data model that identifies data dependencies between data elements within the data blocks and the change information entries. The on-change applicator can include computer program code for retrieving data from other data blocks and non-multidimensional data structures in the database. The on-change applicator can include computer program code for generating the one or more on-change applicator rules based on a changed operand and a resultant, by redefining a mathematical formula using inverse operations for one or more unchanged operands. The on-change applicator can include computer program code for determining data values to be stored in a change information entry, where the determination is made with respect to a dependency structure in the data model that identifies operands required for each on-change applicator for a particular type of change information entries.

In general, in one aspect, the invention provides methods and apparatus, including computer program products, implementing and using techniques for updating a database using a multi-dimensional data model in which data corresponding to the database are organized in multi-dimensional data blocks. Each data block has summary information associated therewith corresponding to a current state of evolution of the associated data block. Dependency information is maintained in the data model to identify data dependencies within and among the data blocks. A list of change entries is maintained which identifies changes made to particular ones of the data blocks and times at which the changes were made. A request to apply a change entry to a data block is received. The change entry is applied to the data block, including generating a dependency list of data blocks whose data depends directly or indirectly from the updated data block. The data blocks in the dependency list are processed in accordance with a dependency update algorithm to update the data blocks in the dependency list.

Various implementations can include one or more of the following features. Processing can include processing a data block in the dependency list if the processing of the data block will generate a new change entry. Each data block can include one or more data elements, and wherein processing can include processing a data block in the dependency list if the processing of the data block may generate a new change entry as a result of an expression for a specific data element that sparse summarizes. Each data block can include one or more data elements, and processing can include processing a data block in the dependency list if the application of a change entry may result in a new change entry that falls out of the evaluation of any expression for any sparse summarizing measure. Processing can include processing each data block in the dependency list. Processing can include storing only non-transient changes into the list of change entries.

Maintaining change information entries can include maintaining a calculation change list number which identifies a point in time at which all change entries have been processed, whereby the calculation change list defines an earliest starting point processing of the data blocks in the dependency list. Several calculation change list numbers can be maintained for subsets of the database, where the collection of subsets form a partition over the data model. The application and the processing can be part of a same operation. Processing can include deferring processing until a data block in the dependency list is queried or until a change list entry is to be applied to a data block in the dependency list. Processing can include processing the data blocks in the dependency list in accordance with a scoping relationship defined by a user's capabilities within the database. Applying a change entry can include applying a compound change entry defining a change that repeats over multiple time periods. Processing can include applying a compound change entry defining a change that repeats over multiple data elements along one or more dense dimensions defining the block. Applying a change entry can include applying a change entry using an on-change applicator. Processing can include applying a change entry using an on-change applicator.

Receiving a request can include receiving a user input value into a cell of a data block that is designated to contain a derived value and monitoring any constraint violations resulting from the user input value until the constraint violations have been resolved. Processing can include determining whether the cell with the user input value has any dependent values in one or more other blocks, and when the cell with the user input value has a dependent value in another block, creating a compensating derived change list entry that adjusts the dependent values in the one or more other blocks. Processing can include determining whether the cell with the user input value has any dependent values in one or more other blocks that are user input and are derived, and when a data value is modified and depends on both the user input derived values, assigning the compensating derived change list entry to only an innermost user input derived value. Processing can include determining whether all values depending from the cell with the user input value are in the same block, reserving additional disk space to indicate that the derived data value has been modified by a user input when all values depending from the cell with the user input value are determined to be in the same block, and ensuring that the user input value is not overridden by a derived value.

A mapping can be created between one or more data elements in a row source and one or more data elements in a data block in order to access and apply calculation rules to data elements stored in a row source format. The mapping can define one or more of a scoping, a dimension map specification and a temporal transformation. The mapping can transform a change list entry for a row source into one or more change list entries for a target cube dependent upon the row source, whereby changes to the row source can be propagated to the target cube. The mapping can transform a dependency relationship of data values within a row source to a dependency relationship within a cube. A mapping can be created between one or more data elements in a first cube and one or more data elements in a second cube. The mapping can define one or more of: allocation operations, transformation operations and aggregation operations. The mapping can define one or more of a scoping, a dimension map specification and a temporal transformation. The mapping can transform a change list entry for the first cube into one or more change list entries for the second cube, where the second cube depends upon the first cube, whereby changes to the data elements in the first cube can be propagated to data elements in the second cube. The mapping can transform a dependency relationship of data values within a cube to a dependency relationship of data values across cubes.

In general, in one aspect, the invention provides methods and apparatus, including computer program products, implementing and using techniques for running multiple scenarios using data from an underlying database. The data is organized according to a multi-dimensional data model in which the data are organized in multi-dimensional blocks. Each block has summary information associated therewith corresponding to a current state of evolution of the associated block. The data model includes dependency information which identifies data dependencies within and among the blocks. A first scenario process is run. The first scenario process maintains first change information which identifies first changes made to copies of first ones of the blocks and times at which the first changes were made. The first scenario process facilitates recalculation of the copies of the first blocks and copies of first dependent blocks to incorporate the first changes. A second scenario process is run substantially simultaneously with the first scenario process. The second scenario process maintains second change information which identifies second changes made to copies of second ones of the blocks and times at which the second changes were made. The second scenario process facilitates recalculation of the copies of the second blocks and copies of second dependent blocks to incorporate the second changes. The first changes are not available to the second scenario process until committed to the underlying database and the second changes are not available to the first scenario process until committed to the underlying database. The underlying database is updated with reference to the dependency information, the summary information, and the first change information, thereby making the first changes available to the second scenario process. The updating includes a reconciliation of the second change information with the first change information, ensuring that the second scenario sees data as if all the first scenario's change information is applied to data blocks before any of the second scenario's change information, thereby preserving data consistency.

Various implementations can include one or more of the following features. Updating can include determining a sequence in which the first changes and the second changes were committed to the underlying database, and in order of the determined sequence, applying the change information to the database, including generating a dependency list of data changes whose data depends directly or indirectly from the prior changed data changes and processing the data changes in the dependency list in accordance with a dependency update algorithm to update the data changes in the dependency list. The first and second scenario processes can be organized in a hierarchical relationship and garbage blocks relating to a scenario process can be collected when one or more of the following situations occur: when a child scenario process is discarded or committed to the database, when changes are committed to a scenario process, or when a reconciliation of two scenario processes occurs. A child scenario process can be committed to the database only when no reconciliation is needed with a parent scenario process and updating can include replacing blocks in the parent scenario process with corresponding blocks from the child scenario process. For each scenario process, whenever a change occurs to a block involved in a scenario process, blocks that are not affected by the change can be evolved to a current state. Each block can be segmented into a header portion and a data portion, and evolving can include determining whether the data portion of the block will remain the same after evolution as before evolution, and when it is determined that the data portion will remain the same, only evolving the header information of the block to a current state. The details of one or more embodiments of the invention are set forth in the accompanying drawings and the description below. Other features and advantages of the invention will be apparent from the description and drawings, and from the claims.

DESCRIPTION OF THE DRAWINGS

Like reference symbols in the various drawings indicate like elements.

DETAILED DESCRIPTION

Figure 1:
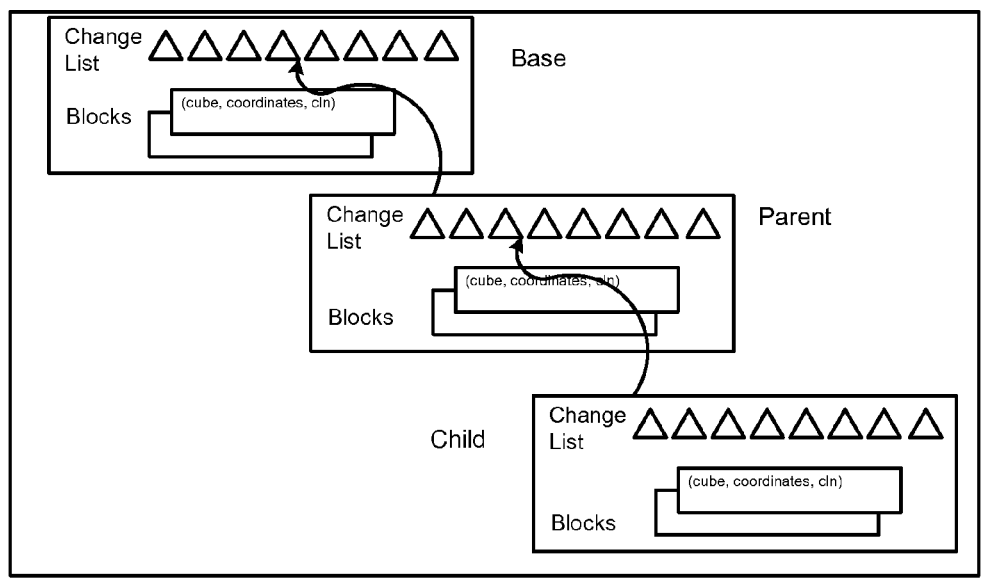
FIG. 1 shows a schematic view of a sandbox hierarchy in accordance with the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that the description is not intended to limit the invention to the described embodiments. On the contrary, the description is intended to cover alternatives, modifications, and equivalents as can be included within the spirit and scope of the invention as defined by the appended claims. In the following description, specific details are set forth in order to provide a thorough understanding of the present invention. The present invention can be practiced without some or all of these specific details. In addition, well-known features may not have been described in detail to avoid unnecessarily obscuring the invention.

Basic Concepts and System Operation

The above referenced patent application describes systems and methods that employ change logging in the maintenance of summary information in large data sets, in combination with dependency checking among data blocks for different levels of hierarchical data in such data sets. This approach results in database management system (DBMS) solutions in which the time required to update or recalculate the underlying data is closer to being a function of the number of changes made rather than, as with most OLAP solutions, a function of the size of the data set or the number of dimensions. The techniques can be applied whether the underlying data set corresponds to a relational or multi-dimensional data model. Embodiments of the present invention provide a well-structured format for performing changes and updates enables more complex operations to be performed. As a result, the system and methods of the invention, enables several users to run much more complex "what-if" scenarios than what was previously possible. The following section describes some general characteristics of the system and some basic concepts. A more detailed description of these features can be found in the above referenced patent application.

According to a specific embodiment of the invention, to facilitate the various techniques described herein, a multi-dimensional data model is employed which organizes data in multi-dimensional cubes. A cube is a multi-dimensional data set. Each data element in a cube is a dimensioned element. Dimensions, which can be sparsely or densely populated, define the number of indices that are used to refer to a data element. A cube said to contain n dimensions uses n indices to define the location of a dimensioned element.

The number of elements in the cube is the cardinality of the Cartesian product of each of the dimensions in the cube. Cubes have dimensionality equal to the number of dimensions that define the cube. Each dimension contains members, and the dimension itself is also a member. The number of members in a dimension (including the dimension itself) defines the cardinality of the dimension. The number of data elements in the cube is the product of the cardinality of each dimension in the cube. Sparsely populated or "key" dimensions are used as keys to index sets of values in the densely populated or "block" dimensions. Such cube subsets are referred to herein as "blocks." In one embodiment of the present invention, the blocks form the calculation units of the system, that is, the smallest subset of the multi-dimensional data set that is calculated together. The blocks also form input/output (I/O) units. As will be discussed below, since all the data in a block is computed together, this allows for complex operations to be performed within the block, such as calculating a median value. Another interesting consequence of using blocks as computation units is that if a data value within a block can be derived from other data values residing within the block, then that data value does not need to be stored and the system can thus operate more efficiently.

As previously noted, the multi-dimensional data model employed in the present invention can correspond directly or indirectly to the underlying data set. That is, the underlying data set can be stored in a multi-dimensional database corresponding to the data model described above. Alternatively, the underlying data set can be stored in a multi-dimensional database which corresponds to a different multi-dimensional model, or even as a relational database corresponding to any of a variety of models. In such cases, the underlying database is mapped to a multi-dimensional data model suitable for facilitating the techniques described herein. These mappings will be described in further detail in a separate section below.

The system and methods described herein use a change list to keep track of modifications made to the data cells. Each modification to a data cell creates a change list entry (CLE). Thus, the application of CLEs from the "beginning of time" to a block results in the current version of that block. An instantiated block on disk has an associated CLE that essentially represents a point in time for the block. To obtain a current version of the block, all CLEs between that point in time and the present are applied.

Before further discussing the notion of the change list and its operation, it may be useful to reintroduce the notion of "sandboxes." A sandbox is also referred to as a scenario, in which a user performs a "what-if" analysis. The notion of sandboxes forms the support for updates of blocks and updates to the same block in different scenarios, which are sometimes run in parallel. Typically, there is a base scenario or base sandbox and a hierarchy of child sandboxes branching from the base sandbox. Updates made to a particular sandbox may or may not be reflected in other sandboxes, depending on their relation in the hierarchy. The general rules for updating blocks and sandboxes have been extensively discussed in the above referenced patent application and will therefore not be discussed here. However, some special cases relating to "sandbox isolation" will be discussed below. Generally, sandbox isolation refers to the notion of providing sandboxes where users can make changes that are isolated from changes that other users are making in parallel, thus allowing each user to work in their own "world" and study how their own changes affect the underlying data set, even though other users simultaneously may be changing the underlying data set in their separate "world."

Returning now to the notion of the change list entries, according to a specific embodiment of the invention, a CLE includes the coordinates of the affected cell, a sandbox identifier (ID), a change number, the parent sandbox ID, the parent sandbox change number, the new value, and the delta from the previously calculated value. A current change list number (CLN) is stored with each sandbox. The CLN is a monotonically increasing number and is incremented every time a change is made to a cell in a block in a sandbox. Each block contains the ID of the sandbox it was calculated against, as well as the CLN at that time. Within a sandbox, change list entry numbering is a simple incremental numbering using a sequence number. The original, underlying database is designated as sandbox 0.

When creating a CLE, the current sandbox CLN is incremented, a new entry for this number is created, and the current parent sandbox CLN is associated with it. Associating the parent CLN facilitates traversing through any ancestors and determining what changes need to be applied to the current sandbox for each parent sandbox. Alternatively, each of the sandbox CLNs can be stored in the block itself. In one embodiment, all the sandbox change lists are arranged within a "master change list" which is a list of all activities that occur within the system.

When a CLE is created, the new data value is always stored. The difference (also referred to as delta value) from the previous data value is stored when it is a sum or aggregation path value. This occurs when the data value is a leaf-level value along block dimensions, and has sum or count as its aggregation operator along the key dimensions (although it should be noted that aggregation operators are not limited to sum or count). After the CLE is created, the delta value is adjusted for all dependent CLEs. This can be accomplished by filtering for change list entries that have a delta value set, are for the corresponding sandbox or its descendants, and where the members have this member as a dependent.

Embodiments of the present invention allow dependencies to be defined between members within the same cube and between members in different cubes. Thus, when a block is retrieved from memory, it can be determined with reference to the dependency structure inherent in the data model and with reference to the change list whether a value change in another cube affects any values in this block. In addition, the dependency structure and the change list provide the necessary information to facilitate the transformation of the change information from one cube to another so that the change may be applied in accordance with the dependency. Transformation and application of change information will be discussed in further detail below in a separate section and can be done whether the underlying data source(s) is relational or multi-dimensional.

Most of the concepts and operations discussed above have been disclosed in the above referenced patent application. However, these concepts are best applied to environments wherein the analytic operations between blocks are aggregating operations, such as sum or count. Such operations do not require attention to be paid to complicating elements such as the order of application, other data values outside the ones changed or in the target block, or data-dependent conditional operations. As the skilled reader recognizes, such elements are encountered in sophisticated data analysis, and there is value in extending such analysis to operations across block boundaries. Special care needs to be taken in such situations to ensure data consistency across changes.

One such situation is when there are multiple arguments involved, such as in the case of a weighted sum. For example, a cost of a product line, expressed in dollars, can be calculated by studying each type of unit in the product line, and multiplying the number of units of the particular type with a unit price for the type of unit, and when all multiplications are done adding the individual results. Whenever the number of units change for any given unit type, or whenever the unit cost changes for one or more of the unit types, this will cause a change to the cost of the product line. Thus, the system must have the capability of addressing such changes. In one embodiment of the invention, this capability is managed by pieces of program code referred to as on-change applicators, which will now be described in further detail.

On-change Applicators

In one embodiment of the invention, changes to blocks are applied by on-change applicators, which can be characterized as pieces of program code that specify formulas for how a given change should be applied to a block. Just as a data value can appear as an operand in many different formulas used to calculate other data values, there can be many on-change applicators associated with a given type of CLE. Separating the data contained within a CLE from the program code used to apply the change can be seen to dramatically reduce the number and types of CLEs.

Generally, the purpose of the on-change applicators is to perform updates to blocks while using data contained in the block itself and the CLE being processed, and not from other blocks. By doing so, the on-change applicator ensures that all data utilized is as of the point in time when the change was originally made, not some earlier or later point in time. This allows a sequence of calculations to be performed with successive change applications wherein the order of application is preserved and resulting in the same data values as if the entire system had been instead invalidated and recalculated with each change. If the change applicator were instead to reference data in other blocks directly, those blocks may be at other points in time from the block being modified, resulting in order inconsistency.

A number of exemplary scenarios involving on-change attributes will now be discussed. The first scenario relates to a simple case in which a measure, x, summarizes along a dimension s1 (that is, x=sum(children(x))). An on-change expression like the following defines what to do when x changes:

<OnChange measure="x" formula="x=target(x)+
        source(delta(x))"/>

This example introduces macros for dereferencing data source and target and for getting at parts of a log entry. It can be seen that on-change applicators exemplified by the above example can be used to support aggregating operations such as sum or count.

The second scenario introduces the situation of a weighted sum described earlier. Here, a demand cube includes product cost aggregated along product lines and computed as the product of unit demand and unit cost. The skilled reader will recognize that both unit demand and unit cost may change over time, that the order of change application must be preserved, and that as each change is processed, the value of the unchanged operand must be available as of the time the change was made to the changed operand. Formulaically, this can be expressed as shown in Table 1 below:

TABLE 1 cost = units * unitCost
<OnChange measure="units"
    formula = "cost = target(cost) + (source(unitCost) * source(delta(units)))" />
<OnChange measure="unit cost"
    formula = "cost = target(cost) + (source(units) * source(delta(unitCost)))" />

As can be seen, in general, one on-change expression is required per operand.

In the above scenario, the CLE must contain not only the old and new values for the data being changed, but also the value at time of change of the other operand. This is accomplished by, at system initialization, inspecting all on-change applicators for the member, and adding all other 'source' operands to the list of values to be stored with the changed values themselves in the CLE. This further implies that, should the system be later modified to adjust a formula or on-change applicator, the change list must be first entirely processed or the system calculated using a batch calculation mechanism. With the above applicator, any product grouping block directly or indirectly depending upon a modified product block can directly be evolved based on its prior value and the change alone, without reference to any other data.

In the above example, it is assumed that both the unit cost and the number of units are stored in the same cube. However, in one embodiment, the on-change applicators also support data retrieval and manipulation for data that is located in separate cubes or other non-multidimensional structures. In such cases, the system ensures that the remote data is not modified between the generation of the CLE and its application.

The third scenario is a more complex allocation scenario that uses external data. Here, a demand cube includes gross projected demand (pd) for a finished good. This projected demand is allocated across manufacturing locations in a manufacturing schedule cube. The allocation percentage is extracted from a third computation unit known as a row source (rs), where data is modeled as relational tuples rather than as a value at a multidimensional intersection. Formulaically, this can be expressed as shown in Table 2 below:

TABLE 2 schedule.pd = demand.pd * rs.allocPct
<OnChange measure="demand.pd"
    formula = "schedule.pd = schedule.pd / old(demand.pd) * new(demand.pd) />
<OnChange measure="rs.allocPct"
    formula = "schedule.pd = schedule.pd / old(rs.allocPct) * new(rs.allocPct) />

The required mapping logic is described in a later section of this document. An interesting aspect of the above scenario is that the second argument used in processing the on-change application logic can be recomputed using the other operands already available in the block and CLE. The recomputing reduces the content that must be collected and stored in the CLE and can be automated through the identification of inverting operations for specific program logic. In the above scenario, for example, a multiplication is inverted through a division. With such inverse operations specified for program logic fragments, operands can be rewritten in terms of the resultant and other operands, and thereby replaced in an on-change applicator utilizing peephole optimization techniques familiar to the skilled practitioner. Further, in cases where all operations utilized in the measure definition have inverting operations known or specified, the on-change applicator itself can be generated through application of peephole optimization rewriting of the original measure definition formula.

In one embodiment, the invocation of on-change programs is governed by the log entry variable, and the applicators are stored in a map, which are keyed by the source measure. Note that there is a one-to-many relationship between the source measure and the applicator. Pseudo-code of change applicator invocation is shown in Table 3 below.

TABLE 3

```
Given data block, b, and a list of entries
If b depends on entry, e,
Map entry
Call Program.execute (entry e, block b)
The execute( ) method will do this
    Find applicator program(s) for delta in entry e
    Setup execution context     // this binds variables in the
                                // program to the entry and
                                // the block
    For all applicator programs, p,
        Execute p
```

The applicator programs are segmented by target measure, which makes it possible to support several target measures that are functions of a single source measure. Since the program lookup key must be the source measure, there can be several applicator programs for a single log entry.

A fourth scenario relates to ordering dependent on-change variables where several applicator programs exist for a single log entry. Consider log variables x and a, where x is a function of a and q, that is x=f(a, q), and a is a function of q, which is an on-change variable, that is a=f(q). In such a situation the on-change applicator programs must be applied in proper order. In one embodiment, the order for application of the on-change applicator programs is maintained by referencing the dependency structure. Specifically, a needs to be evaluated before x because x is a function not only of q but also of a. Such orderings can be established at system initialization time by enumerating the on-change applicators using a partial ordering based on a recursive traversal of their definitions.

A related scenario is a follows: x=f(z, q), where z is a formula measure that is computed at block calculation time and q is an on-change measure. This presents a problem because the value of z will not be known until the block calculator is invoked. Thus, in order to support this type of scenario a block calculation needs to be spliced into the process of log application.

The above scenarios show how on-change applicators can be used to calculate measures in a block when updates are made to a block, by accessing data within a block, by accessing data in other blocks, and mapping the data to the measure that is being updated, or by accessing data from external sources, such as row sources in a relational database. The change list is the communication mechanism for interdependent data values that can reside in different blocks, cubes or row sources.

In some cross-cube computations, the measure definition includes an on-change attribute, which specifies an expression for summarization. This allows cubes to differ in their hierarchical aggregation structure, with only a subset of the two cubes needing to be mapped to each other. In such cases, the base formula identifies the data sources used for aggregation, while the operand formulas define the actions that are to be taken when changes to operands are encountered. Table 4 below illustrates how a measure with on-change expressions might look, and shows a Projected Demand (PD) measure definition for a schedule cube.

TABLE 4

```
<Measure name="pd" type="derived" displayName="Projected
Demand Units">
    <Formula>
        <!-- dense calculation formula -->
        schedule.pd = rs.allocation * demand.pd
    </Formula>
    <OnChange measure = demand.pd>
        <Formula>
            schedule.pd = old(schedule.pd) / old(demand.pd) *
new(demand.pd)
        </Formula>
        <Dimension name="Product" />
        <Dimension name="InventoryLocation" />
    </OnChange>
    <OnChange measure = rs.allocation>
        <Formula>
            Schedule.pd = old(schedule.pd) / old(rs.allocation) *
                new(rs.allocation)
        </Formula>
        <Dimension name="Product" />
        <Dimension name="InventoryLocation" />
    </OnChange>
    <!-- on-change expressions for summarizing along manufacturing
                dimension -->
</Measure>
```

As can be seen in Table 4, an on-change attribute can specify one or more dimensions. In the multiple dimension case, this means that a summary will be evaluated in the same way along each dimension. Furthermore, since data source information can be inferred from the on-change expression, it is not necessary to specify a dependency structure in the member definition. In such cases, the initial user change entry must be supplemented with a system-generated change entry to further propagate the change along the summarizing dimensions.

One side effect of this is that the application of a single change may lead to a cascade of change generation and application. Because the change log is the basis for data consistency in the DBMS, the cascade must happen before any values depending upon the cascade of changes may be queried. The TouchList is the data structure that enforces this consistency, and will now be discussed in further detail.

TouchLists and Related Concepts

As was discussed above, there are situations in which a change can lead to a whole cascade of changes. For example, assume that an inventory of parts periodically changes over time. The beginning inventory at a time T is equal to the ending inventory at a time T−1. It is also equal to the beginning inventory at time T−1 plus receipts minus demands. Similarly, the beginning inventory at a time T+1 is equal to the ending inventory at a time T, or expressed differently, the beginning inventory at time T plus receipts minus demands. Now, if the demand changes at time T−1, for example, this will affect all the future beginning and ending inventory values at time T, T+1, T+2, and so on. If inventory is not allowed to be represented as negative should it be inadequate to service demand, in order to determine an available inventory at a time T+17, all the changes between T−1 up through T+16 must be applied, and no steps can be skipped. If the values for each time T are kept in different computation units or blocks, the change list must be utilized to communicate changes across these blocks, and the changes must cascade in the dependency order. In one embodiment, the way this is ensured is through the TouchList mechanism.

When a CLE is generated, the block key for that entry is added to the TouchList if application of the change record would result in generation of additional change entries. When entries on the initial list are "touched", they are calculated to the present point in time through change list application and block calculation, and generate their own change entries which may, in turn, require block keys to be added to the TouchList. This process continues recursively until no more entries are generated.

The touching algorithm can yield consistent results with varying degrees of efficiency. At one end of the spectrum is a "sledge hammer algorithm" approach that visits every block along all dependency paths; at the other, is an algorithm that visits a smaller set of blocks based on knowledge about what would change if a given change were to be applied. Four exemplary implementations of this grading are as follows (ordered from least conservative approach to most conservative approach). The first implementation involves touching a block if the application of a change entry will result in a new change entry. The second implementation involves touching a block if the application of a change entry may result in a new change entry that falls out of the evaluation of an expression for a specific measure that sparse summarizes. The third implementation involves touching if the application of a change entry may result in a new change entry that falls out of the evaluation of any expression for any sparse summarizing measure. The fourth implementation involves touching every block along the dependency path.

The notion of touching a block has been described in the above referenced patent application. Briefly stated, the idea is to check whether the block CLN is less than the sandbox CLN. If so, there may be CLEs that need to be applied to the block. The database is then searched for the list CLEs that are applicable, and these are then applied to the block. The block CLN is then advanced to the sandbox CLN.

As the skilled reader realizes, for large data sets, there can be a large number of touch list entries. Since the DBMS in accordance with the invention runs in time that is proportional to the number of changes, it is desirable to reduce the number of system changes. One way of reducing the system changes was described above with respect to selecting an appropriate touching algorithm. Another technique for reducing the number of changes is associated with the notion of transient changes. If a user requests a block change, and the DBMS touches all blocks that are affected (directly or indirectly) by the request, there is no need to store the changes, since all variables that will ever be affected by that particular request have been changed.

Another way of reducing the number of changes relates to how the calculation change list number (Calc CLN) is advanced. As was described in the above referenced application, the Calc CLN for a particular cube reflects at any time, the change list number that is guaranteed to have been applied to all blocks in that sandbox. In other words, all blocks in that sandbox are at least "current" up to the Calc CLN of that sandbox. The sandbox-specific Calc CLN can be further segmented to be a set of CLNs specific to each cube within the analytic model. When a subsequent change has been made to a block and the system has confirmed that no further changes will result for any of the blocks in the sandbox for a particular cube, then the Calc CLN of that sandbox for that cube is advanced. Having more current Calc CLNs results in a faster touching process, since fewer CLEs need to be applied during touching.

Yet another way of increasing the efficiency of the system is to defer change generation. Data consistency requires that all changes be generated before values that may be dependent upon them interrogate the change list. The interrogation can be strongly constrained by ensuring that all dependent changes are generated as part of the user operation generating the initial set of changes by draining the TouchList as part of the same user operation. In this case, after the user operation, any block may be queried with assurance that all entries have been generated. The interrogation can also be weakly constrained by instead ensuring that all dependent changes that a particular block is directly or indirectly dependent upon have been generated prior to that block being calculated. This can be done by interrogating the TouchList prior to change list application when querying a block, and processing entries on the list until no dependency relationship exists between entries on the TouchList and the block being queried. This can be more efficient than the strong constraint when only a fraction of affected blocks are likely to be queried as part of further analysis. Any condition between the strong and weak constraint can be used, as appropriate.

In some embodiments additional timesaving can be achieved through scoping. Assume, for example, that a user performs an inventory analysis and is only able to see inventory-related data. In such a situation, the user will not be able to access (or care about), for example, fiscal data. Thus, since the outer bounds of a user's capabilities within the system are known a priori, the updates of the underlying data sets can be limited to within these outer bounds, in order to save processing time. In one embodiment, this scoping relationship is created by associated sandboxes used for analysis with an "analysis type" that defines the data scope of the analysis.

One embodiment of the invention supports the notion of compound entries. Compound entries are best explained with reference to the changing inventory example described above. As was discussed, a change to the demand changes at a particular time will affect all the future beginning and ending inventory values at subsequent times. In addition, the demand change can cause cascading changes to other blocks, for example, subassemblies or products using the part, delivery times, and so on, may change. All of these cascading changes can be generated as individual changes. However, since the processing time is proportional to the number of changes, this is typically not recommended. Instead, the system of the invention supports the use of compound changes, which is similar to vector math. That is, there is a dependency only on one part, but the change repeats over multiple time periods. As a result, instead of having to add several change list entries and having to perform dependency analysis for each of them, only one entry is added for which dependency analysis is necessary. In one embodiment the on-change applicator programs are capable of supporting vectors, such that multiple values can be transferred between blocks and applied to the target measure in a single operation. This yields both far more efficient processing of the change list for the multitude of blocks that do not depend upon a change as well as more efficient application for the blocks that do depend upon the change.

Upper Level Input

In one embodiment, the system of the invention allows a user to input values into cells that typically contain derived values, such as upper-level cells. Thus, a user can set the value of a calculated value to something other than the results of calculating its dependents. This allows support for operations such as top-down allocation, by allowing a goal-derived value to be set prior to changing the input values used in computing the derived value. In one embodiment, this feature is enabled by retaining some extra disk space for cells that are normally derived but can be overridden by user input values.

The system also monitors any constraint violations that occur in response to the user changing the derived value. For example, assume that a company is expected to produce 10 units of a product during the month of January, 10 units in February and 10 units in March. The total production for the first quarter is then typically a derived value that is equal to the sum of the individual monthly produced units, i.e. 30 units. If the user changes the total production for the first quarter to 50 units, there is a difference of 20 units, which introduces a constraint violation, where the operands do not sum up. This change needs to be maintained along with the constraint violation. When the user changes one of the operand values, e.g., the January value to 15 and the February value to 15, making the actual sum 40 units for the first quarter, then the difference causes the constraint violation to become 10 units instead of 20 units. Subsequently, if the March value is changed to 20, the difference is now zero, and the constraint violation has been addressed. As the skilled reader notes, during this entire period, the value for the Year value should have been adjusted by the 20 units specified by the change to the first quarter value, but not additionally adjusted by the changes to January, February or March in the subsequent operations, until the constraint violation has been satisfied.

One embodiment of the invention supports a derived category of CLEs for such user-specified derived values that additionally contain the "net change", or the remaining error between the user-specified target value and the value in the operands. As subsequent CLEs are created, the CLEs are tested to determine whether the derived entry has a dependency upon them. If so, a compensating derived CLE is created that adjusts the net change by the amount affected by the underlying calculation, using the on-change mechanisms discussed above, and decrements the delta amount by a similar amount so other dependent values are not affected.

It is also possible that multiple derived values changes have been made, one of which depends on the next. For example, this can occur if the user modifies the Year value in addition to the first quarter. In this case, a change to the January value should be compensated by a change to the first quarter change, but not affect the Year value, since the error in the quarterly number will absorb the compensation. However, a change to an April number should directly impact the Year value. In one embodiment of the invention, the active derived CLEs are maintained in a dependency hierarchy. When subsequent CLEs are created to be tested against the derived CLEs, they are first tested against the roots of the hierarchy. If a dependency is found, they are further recursively tested against derived CLEs that the parent derived CLE depends upon. Compensation is performed against the lowest elements in the hierarchy where no children exist that are also dependent.

It was noted earlier that when data values within blocks are entirely computed from other data values residing within the same block, then that data value does not need to be stored. In one embodiment, this feature is enabled by retaining some extra disk space for cells that are normally derived but can be overridden by user input values utilizing a bitmap indicating values that have been user-specified and should not be overridden by calculation. Additionally, such values do not generate derived CLEs in the manner above, since the net delta can always be computed by recalculating the formula from its arguments within the same block and comparing the result data value with the one stored, thus allowing the system to operate more efficiently.

Mappings

As was discussed above, for various reasons it is advantageous to maintain different types of data in different formats (cubes, row sources, and so on), for example, since different data has different dimensionality. Row sources are particularly interesting when the data is more efficiently stored in a relational format than in a multi-dimensional cube format, or where the data is intrinsically relational. For example, a unit cost typically does not change very often, so there is inefficiency introduced in duplicating the unit cost value for every time period along a time dimension, as described above.

In one embodiment, the system of the invention provides a mapping between row sources, such as relational databases, and cubes, such that row source or table data can be referred to during cube calculations. Such mappings are particularly important during operations involving aggregation, that is, where dimensions are collapsed, and allocations, that is, where dimensions are expanded. For example, there can be a situation in which sales data is stored for a product line in dollars and by geographical region, and a user would like to view the data as number of units per product for each product in the product line, and without respect to the geographical regions. In this case, several conversions need to be made. First, the product line will be converted into products, that is, an allocation operation needs to be performed, which can take place, for example, by using a product ratio for each product in the product line. The product ratio can typically be obtained from cube historical data. Next, the monetary values in dollars need to be converted into numbers of units, which can be done, for example, by consulting an average selling price (ASP) in a row source, such as a relational database table. This is an example of a transformation operation. Finally, the geography information needs to be collapsed, such that the data is no longer broken down into geography regions. This is an example of an aggregation operation. All of these conversions can be realized by providing mappings between cubes, or between cubes and row sources, as will now be described in further detail.

A mapping must define the subset of the source and target regions being mapped. For example, when mapping one cube to another, the scope of applicability along each dimension must be specified. Additionally, the members in each dimension within the scope must be mapped to one or more members along one or more dimensions in the target. When mappings are not one-to-one, allocation or aggregation information must be specified.

With mappings defined, dependency analysis can be performed across unlike data such as multidimensional elements with different dimensionality or relational and multidimensional elements. Two exemplary implementations for performing dependency analysis and application of changes with mappings are as follows. The first implementation involves applying the mapping to transform a CLE from the source mapping into the corresponding set of entries on the target, and then applying dependency analysis against each of the target entries as in the single cube model. The second implementation involves generating dependency structures directly from source dimensions to target dimensions, so dependency analysis can be performed against the CLE directly without mapping, and then only mapping prior to execution of change list applicators if a dependency relationship is established. Note that a dependency relationship can exist between two values even if they do not reside within the scope of the mapped regions, for example if the target value summarizes from a value in the mapped target region or the source value summarizes into a value in the mapped source region.

The above example is just one example of where mappings are useful. As the skilled reader will realize, other situations can be constructed where mappings are useful. For example, mappings can define a scoping, which specifies which members of which dimensions participate in the cross-cube mapping. Mappings can define a dimension map specification, such that a "parent" function is included when there is a mapping from a product dimension to a product line dimension, and a "children" function is included when there is a mapping from a product line dimension to product dimension. Mappings can define temporal transformations, such as a transformation from monthly data to weekly data or from a fiscal calendar to a manufacturing calendar.

Sandboxes

Up to this point, the scenarios described above have been primarily focused on changes generated directly or indirectly from a single user's changes or "what if" scenarios. Often there are situations in which multiple users would like to run alternate "what if" scenarios on the same underlying dataset. However, as was seen in the inventory example above that was discussed in the touchlist section, there is often an ordering dependency in the application of changes. This can lead to problems across sandboxes just as it does within them. For example, assume a situation in which a user A and a user B work on the same data set, using different sandboxes. User A and user B run various separate "what if" scenarios, which cause different types of cascading to be done, as was discussed above, leading to different results. Now, if user A were to submit her changes to the underlying database, the data will change, and all the cascading done by user B would be invalid. This is not acceptable, and therefore the system needs to have built-in mechanisms for addressing situations such as this. In particular, consistency now requires that all of the changes made by user A appear to have happened prior to those made by user B, since that would be the sequence if user B were to then submit his changes. Some of these mechanisms will now be described, but first a more detailed review of the sandbox notion will be presented.

In the above referenced application, and above, the use of sandboxes has been described from various aspects. As a result of the new operations and capabilities of the system that has been described above, it is desirable to refine the change application and isolation for sandboxes to ensure that consistency is maintained across sandboxes and to avoid various problems that would otherwise occur, ranging from unexpected numbers in certain cells to runtime exceptions.

As was described above, sandboxes are introduced to isolate changes so that different change scenarios can be studied separately. Sandboxes can form a tree hierarchy, where the top sandbox is referred to as the base sandbox, or the base. It should be noted that cubes in different sandboxes share the same meta-data, that is, cube definitions. The main differences among the sandboxes are blocks and changes. The base has its own set of blocks with cell values derived from committed changes by other sandboxes. All the other sandboxes are either children of the base or descendents of the base. Each of the sandboxes has its own separate set of blocks. These blocks are "snapshots," that is copies made at a particular point in time, of the blocks in the parent sandbox with changes from the child sandbox(es) applied. The process of taking snapshots and applying changes is also referred to as change isolation and application.

In one embodiment, the sandboxes are treated as long-running transactions with optimistic locking. Changes are stored as change list entries for a number of purposes. The base sandbox can be viewed as a long-running transaction that can never be committed. A sandbox can be submitted (that is, a transaction can be committed) only when all its child sandboxes have been either submitted or discarded.

Generally, sandboxes follow the similar change isolation rules as in databases. If two sandboxes do not have nesting relationship, they cannot see each other's changes. On the other hand, a child sandbox can typically see changes in its parent sandbox, with some restrictions that will be described in further detail below. A parent sandbox can have more than one child sandbox. These child sandboxes progress independently. Some sandboxes may be finished or discarded earlier than others. Therefore, between parent and child sandboxes, optimistic locking is used where snapshots of blocks are made and modified in the child sandboxes. To obtain consistent block snapshots, the child sandbox keeps a reference of the last change in the parent that was applied in the child. All the future changes are ignored for taking snapshots. This is another aspect of change isolation. This is schematically illustrated in FIG. 1, which shows a hierarchy of base, parent, and child sandboxes. Each sandbox has its own CLEs, and contains a reference back to its respective parent CLE where the snapshot was made.

In one embodiment, the DBMS in accordance with the invention uses a mechanism different from the prior optimistic locking models. Rather than waiting until the end of the transaction (that is, submitting the child sandbox) before doing reconciliation, reconciliation can be performed continuously, since the reconciliation process is deterministic based on the notion that changes in a child sandbox have precedence over those in its parent sandbox. The reconciliation process will be discussed in further detail below.

A sandbox has an attribute, Snapshot CLN, which specifies a consistency point in a parent sandbox that a child sandbox is consistent with. In other words, the child sandbox is not supposed to see changes in the parent sandbox that occurs after the Snapshot CLN, until the changes in the child sandbox are reconciled with the parent. Thus, when a change occurs that causes a block of a parent sandbox or the base to evolve, the system checks whether the evolution crosses the Snapshot CLN. If the evolution does not cross the snapshot CLN, then the block is updated as described above. However, if the evolution crosses the snapshot CLN, then the block is first copied such that the child sandbox will have access to the "stale" block data from the parent sandbox, and then the block is updated as described above.

A block key has the following components: sandbox id, sparse coordinates, and CLN. The CLN specifies the version of the block, and ensures that the block has been evolved to this point in logical time. Expressed differently, all prior changes in the log have been applied to the block up to the CLN (or the block does not depend on the changes). Any subsequent changes have not been applied (or the block does not depend on the changes).

In one embodiment of the invention there are two methods for retrieving a block for a sandbox. The first method includes retrieving a block with changes from the current sandbox up to the current Sandbox CLN (max CLN). Note that the Sandbox CLN is a CLN that is used to represent the "current" point in time in the log, that is, the number of the last log entry for this particular sandbox. The other method includes retrieving a block with changes from the current sandbox up to a specific CLN. As the skilled reader will realize, the first method can be reduced to the second method by using the current CLN of the sandbox. Pseudo-code for retrieving a block for a sandbox child for a particular CLN is shown in Table 4 below:

TABLE 4

```
/**
* Retrieve a block for sandbox Child for a particular cln
*/
getBlock(sandboxID, comboKey, expectedCLN)
Try to locate a block with the sandbox ID, comboKey, and cln
no greater than expectedCLN.
If block is found, apply remaining changes when block cln is
less than cln and return the copy, and persist/materialize the
copy.
If such a block cannot be found from the current sandbox,
recursively find a copy from the parent using snapshotCLN.
This is the process of taking snapshots. Snapshots are not
saved.
This will result either in finding a copy or creating a blank block from
the base.
Then apply remaining changes as the recursion rewind.
```

In one embodiment there are three ways to create all the blocks in sandboxes other than the base. The first one is through applying changes introduced locally. The second way is through on-demand block retrieval for various tasks, such as manipulating analysis spreadsheets, displaying key metrics, and reporting. The third way is through child sandbox submissions.

Figure 2:
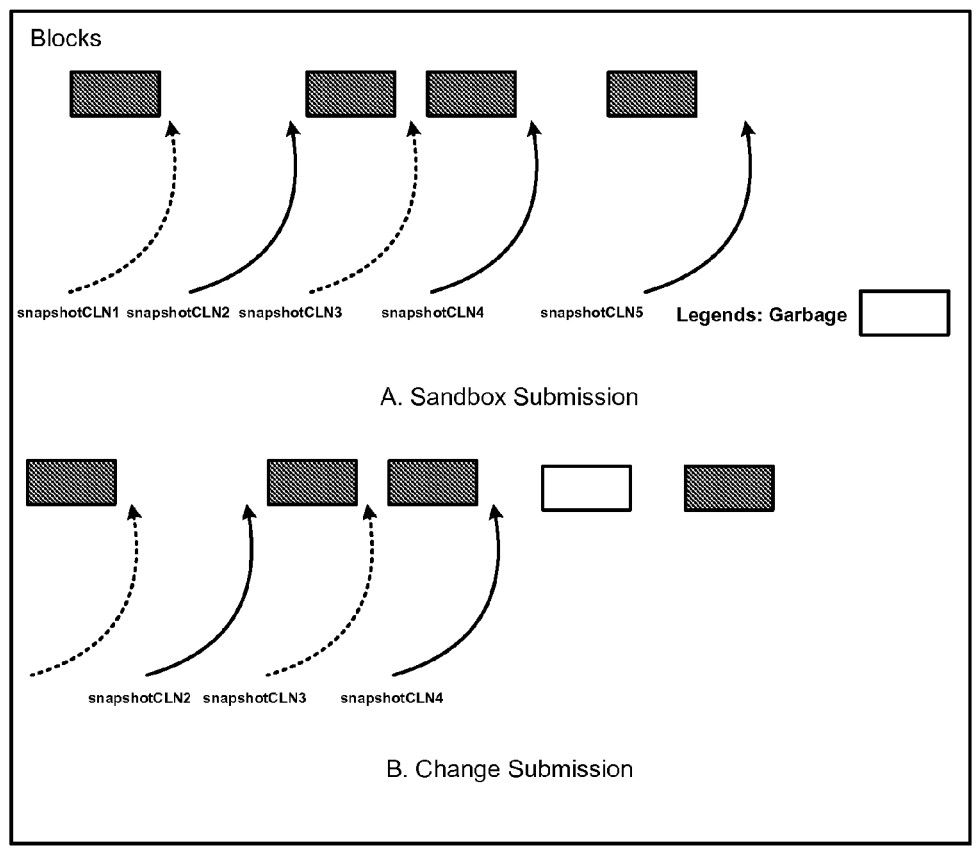
FIG. 2 shows a schematic view of how garbage collection of sandboxes is performed in accordance with the invention.

Different revisions of a block, represented by block CLNs, need to be kept around for various reasons. For example, FIG. 2 shows how a child sandbox is created with a Snapshot CLN1. As illustrated in FIG. 2, and discussed above, it is necessary to keep a revision of the block with block CLN less than or equal to Snapshot CLN1. There can also be different sandboxes created with different Snapshot CLNs, for which different block revisions need to be kept. Some block revisions can become garbage blocks when a child sandbox is discarded or submitted, or when a new change is introduced that causes a new revision to be generated.

In one embodiment, for efficiency reasons, garbage blocks in a sandbox are collected only when a child sandbox is discarded or submitted, when changes are submitted to the sandbox, or when reconciliation occurs. For example, assume that the Snapshot CLNs of all the child sandboxes in ascending order are $s_1, \ldots, s_n$ where $n \geq 0$. For any two neighbors x and y in the sequence of Long.MIN, $s_1, \ldots, s_n$, Long.MAX, if there is more than one block revision with a block CLN between x and y (inclusive), then all such block revisions except the last one are garbage blocks.

Next, the reconciliation process will be described. In one embodiment, reconciliation can be initiated at any level of sandbox hierarchy and is only needed when the Sandbox CLN is greater than any Snapshot CLN for any child sandbox. In the sandbox where the reconciliation is initiated, the following steps are performed: First, all the garbage blocks are deleted under the assumption that no active child sandboxes exist. Next, the sandbox hierarchy is traversed recursively, and for each descendent the following is performed: A new sandbox is created that will be used to replace the descendent. The current Sandbox CLN of the parent is taken as the Snapshot CLN. Non-internal change entries, such as user-initiated changes, are extracted from the old sandbox and a touch list is built. The touch process is then performed, as described above. Finally, the old sandbox is discarded and the new sandbox is associated with the corresponding response. It should be noted that reconciliation is not necessary when there is order independence between the blocks.

When change entries relate to relational databases, copies are kept of all old columns and all new columns that are necessary, either for doing the mapping to the cubes, or for obtaining data values for the cubes. The multiple copies are used when reconciliation occurs. Several users may have changed different values located in the same row of the relational database, and these changes need to be merged upon reconciliation. For example, in a relational order database, a first user may have made a change to the quantity of the order and another user may have made a change to a delivery date of the same order. Since both of these pertain to the same order, these changes need to be kept as separate copies until reconciliation, when they are merged.

In one embodiment, a child sandbox can be submitted only when there is no need to reconcile at its parent. Under such a condition, the submission does not require the evolution of the parent blocks by applying the child sandbox changes. Instead, the two sandboxes can be merged, by deleting each of the blocks in the parent sandbox where a block exists in the child sandbox, and re-keying the child sandbox blocks to represent entries in the parent sandbox, by updating their sandbox ids and adjusting their change list number values to represent the point in the merged log.

Next, garbage blocks are removed, as described above. The garbage block removal is followed by a submission of events. The submission includes getting IDs of all broken constraints created in the child, marking all broken constraint events created in the child as created in the parent, and using the IDs of all broken constraints to create new records for the child, which are subsequently marked as closed and fixed. Next the broken constraints are submitted by deleting every broken constraint in the parent that has a constraint in the child with the same coordinates, and adding all broken constraints in the child to the parent. The Calc CLN is then adjusted for each cube in the parent by the Calc CLN of that cube in the child sandbox. Finally, the change entries are submitted by cloning change entries from the child sandbox and appending them to the end of the change list of the parent. The Sandbox CLN is changed accordingly, which completes the child sandbox submission.

As can be seen from the above discussion, it is beneficial to keep as current versions of the blocks as possible, in order to minimize the time spent interrogating the blocks when changes are applied. For this reason, in one embodiment of the invention, a block is moved forward not only when they change, but also when the system determines that none of the changes applies to the block. However, if the block data does not change, it is inefficient to keep multiple copies around of the same block data. Therefore, in one embodiment of the invention, the blocks are segmented into a header portion and a data portion, and whenever a block is evolved without changing its data, the data portion remains the same and only the header is moved forward.

The invention can be implemented in digital electronic circuitry, or in computer hardware, firmware, software, or in combinations of them. Apparatus of the invention can be implemented in a computer program product tangibly embodied in a machine-readable medium for execution by a programmable processor. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention can also be embodied in a carrier wave traveling over an appropriate medium such as airwaves, optical lines, electric lines, and so on. Method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood by those skilled in the art that various modifications can be made without departing from the spirit and scope of the invention. For example, the invention can also be used to evolve summary tables in a relational database representing the results of complex analytic operations performed against central transaction or fact tables. Accordingly, other embodiments are within the scope of the following claims.

What is claimed is:

1. A computer-implemented method for updating a database using a multi-dimensional data model in which data corresponding to the database are organized in multi-dimensional data blocks, each data block having summary information associated therewith corresponding to a current state of evolution of the associated data block, the method comprising:

maintaining dependency information in the data model which identifies data dependencies within and among the data blocks;

maintaining a list of change entries which identifies changes made to particular ones of the data blocks and times at which the changes were made;

receiving a request to apply a change entry to a data block;

applying the change entry to the data block, including generating a dependency list of data blocks whose data depends directly or indirectly from the updated data block;

processing the data blocks in the dependency list in accordance with a dependency update algorithm to update the data blocks in the dependency list; and updating the database with reference to the dependency information, the summary information, and the list of change entries;

wherein processing includes:

determining whether a cell with a user input value has any dependent values in one or more other blocks;

when the cell with the user input value has a dependent value in another block, creating a compensating derived change list entry that adjusts the dependent values in the one or more other blocks;

determining whether a cell with a user input value has any dependent values in one or more other blocks that are user input and are derived;

when a data value is modified and depends on both the user input derived values, assigning the compensating derived change list entry to only an innermost user input derived value;

determining whether all values depending from the cell with the user input value are in the same block;

when all values depending from the cell with the user input value are determined to be in the same block, reserving additional disk space to indicate that the derived data value has been modified by a user input; and ensuring that the user input value is not overridden by a derived value.

2. The method of claim 1, wherein processing includes processing a data block in the dependency list if the processing of the data block generates a new change entry.

3. The method of claim 1, wherein each data block includes one or more data elements, and wherein processing includes processing a data block in the dependency list if the processing of the data block may generate a new change entry as a result of an expression for a specific data element that sparse summarizes.

4. The method of claim 1, wherein each data block includes one or more data elements, and wherein processing includes processing a data block in the dependency list if the application of a change entry may result in a new change entry that falls out of the evaluation of any expression for any sparse summarizing measure.

5. The method of claim 1, wherein processing includes processing each data block in the dependency list.

6. The method of claim 1, wherein processing includes storing only non-transient changes into the list of change entries.

7. The method of claim 1, wherein maintaining change information entries includes maintaining a calculation change list number which identifies a point in time at which all change entries have been processed, whereby the calculation change list defines an earliest starting point processing of the data blocks in the dependency list.

8. The method of claim 7, wherein several calculation change list numbers are maintained for subsets of the database, wherein the collection of subsets form a partition over the data model.

9. The method of claim 7, wherein the applying step and the processing step are part of a same operation.

10. The method of claim 1, wherein processing includes processing is deferred until a data block in the dependency list is queried or until a change list entry is to be applied to a data block in the dependency list.

11. The method of claim 1, wherein processing includes processing the data blocks in the dependency list in accordance with a scoping relationship defined by a user's capabilities within the database.

12. The method of claim 1, wherein applying a change entry includes applying a compound change entry defining a change that repeats over multiple time periods.

13. The method of claim 1, wherein processing includes applying a compound change entry defining a change that repeats over multiple data elements along one or more dense dimensions defining the block.

14. The method of claim 1, wherein applying a change entry includes applying a change entry using an on-change applicator.

15. The method of claim 1, wherein processing includes applying a change entry using an on-change applicator.

16. The method of claim 1, wherein receiving a request includes: receiving a user input value into a cell of a data block that is designated to contain a derived value; and monitoring any constraint violations resulting from the user input value until the constraint violations have been resolved.

17. The method of claim 1, further comprising: creating a mapping between one or more data elements in a row source and one or more data elements in a data block in order to apply calculation rules to the data blocks that access data elements stored in a row source format.

18. The method of claim 17, wherein the mapping defines one or more of: a scoping, a dimension map specification and a temporal transformation.

19. The method of claim 17, further comprising: using the mapping to transform a change list entry for a row source into one or more change list entries for a target cube dependent upon the row source, whereby changes to the row source can be propagated to the target cube.

20. The method of claim 17, further comprising: using the mapping to transform a dependency relationship of data values within a row source to a dependency relationship within a cube.

21. The method of claim 1, further comprising: creating a mapping between one or more data elements in a first cube and one or more data elements in a second cube, wherein the mapping defines one or more of: allocation operations, transformation operations and aggregation operations.

22. The method of claim 21, wherein the mapping defines one or more of: a scoping, a dimension map specification and a temporal transformation.

23. The method of claim 21, further comprising: using the mapping to transform a change list entry for the first cube into one or more change list entries for the second cube, wherein the second cube depends upon the first cube, whereby changes to the data elements in the first cube can be propagated to data elements in the second cube.

24. The method of claim 21, further comprising: using the mapping to transform a dependency relationship of data values within a cube to a dependency relationship of data values across cubes.

25. A computer-implemented method for running multiple scenarios using data from an underlying database, the data being organized according to a multi-dimensional data model in which the data are organized in multi-dimensional blocks, each block having summary information associated therewith corresponding to a current state of evolution of the associated block, the data model further comprising dependency information which identifies data dependencies within and among the blocks, the method comprising:
running a first scenario process in a first sandbox, the first scenario process maintaining first change information which identifies first changes made to copies of first ones of the blocks and times at which the first changes were made, the first scenario process facilitating recalculation of the copies of the first blocks and copies of first dependent blocks to incorporate the first changes;
running a second scenario process substantially simultaneously with the first scenario process in a second sandbox, the second scenario process maintaining second change information which identifies second changes made to copies of second ones of the blocks and times at which the second changes were made, the second scenario process facilitating recalculation of the copies of the second blocks and copies of second dependent blocks to incorporate the second changes;
wherein the first changes are not available to the second scenario process until committed to the underlying database and the second changes are not available to the first scenario process until committed to the underlying database; and
updating the underlying database with reference to the dependency information, the summary information, and the first change information, thereby making the first changes available to the second scenario process,
wherein the updating includes a reconciliation of the second change information with the first change information, ensuring that the second scenario sees data as if all the first scenario's change information is applied to data blocks before any of the second scenario's change information, thereby preserving data consistency
wherein updating includes:
determining a sequence in which the first changes and the second changes were committed to the underlying database;
in order of the determined sequence,
applying the change information to the database, including generating a dependency list of data changes whose data depends directly or indirectly from the prior changed data changes; and
processing the data changes in the dependency list in accordance with a dependency update algorithm to update the data changes in the dependency list.

26. The method of claim 25, wherein the first and second scenario processes are organized in a hierarchical relationship and further comprising: collecting garbage blocks relating to a scenario process when one or more of the following situations occur: when a child scenario process is discarded or committed to the database, when changes are committed to a scenario process, or when a reconciliation of two scenario processes occurs.

27. The method of claim 25, wherein a child scenario process is committed to the database only when no reconciliation is needed with a parent scenario process; and wherein updating comprises replacing blocks in the parent scenario process with corresponding blocks from the child scenario process.

28. The method of claim 25, further comprising:
for each scenario process, whenever a change occurs to a block involved in a scenario process, also evolving blocks that are not affected by the change to a current state.

29. The method of claim 28, wherein each block is segmented in to a header portion and a data portion, and evolving includes:

determining whether the data portion of the block will remain the same after evolution as before evolution; and when it is determined that the data portion will remain the same, only evolving the header information of the block to a current state.

* * * * *

UNITED STATES PATENT AND TRADEMARK OFFICE
CERTIFICATE OF CORRECTION

PATENT NO. : 7,571,192 B2  Page 1 of 1
APPLICATION NO. : 11/154259
DATED : August 4, 2009
INVENTOR(S) : Anurag Gupta et al.

It is certified that error appears in the above-identified patent and that said Letters Patent is hereby corrected as shown below:

In column 19, line 15, delete "Table 4" and insert -- Table 5 --, therefor.

In column 19, line 15, delete "TABLE 4" and insert -- TABLE 5 --, therefor.

In column 22, line 16, in claim 1, after "whether" delete "a" and insert -- the --, therefor.

In column 22, line 16, in claim 1, after "will" delete "a" and insert -- the --, therefor.

Signed and Sealed this

Twenty-ninth Day of June, 2010

David J. Kappos
*Director of the United States Patent and Trademark Office*